United States Patent [19]
Ophey

[11] Patent Number: 6,094,309
[45] Date of Patent: Jul. 25, 2000

[54] HEAD-MOUNTED DISPLAY

[75] Inventor: Willem G. Ophey, Eindhoven, Netherlands

[73] Assignee: U.S. Philips Corporation, New York, N.Y.

[21] Appl. No.: 09/235,363

[22] Filed: Jan. 21, 1999

[30]  Foreign Application Priority Data

Jan. 28, 1998 [EP]  European Pat. Off. .............. 98200239

[51] Int. Cl.[7] ................................................... G02B 27/14
[52] U.S. Cl. ........................................... 359/630; 359/618
[58] Field of Search ............................... 359/633, 13, 19, 359/630, 631, 462; 345/7, 8

[56]  References Cited

U.S. PATENT DOCUMENTS 5,035,474  7/1991  Moss et al. .............................. 359/630

FOREIGN PATENT DOCUMENTS

96/05532  2/1996  WIPO ............................ G02B 27/01

*Primary Examiner*—Georgia Epps
*Assistant Examiner*—Younggil Timothy Lee
*Attorney, Agent, or Firm*—Peter Verdonk

[57]  ABSTRACT

The present invention relates to a head-mounted display comprising at least one image display panel and an optical system for projecting an image in a left and right exit pupil of the head-mounted display. The optical system comprises a beam splitter, a hollow mirror and a first and a second light channel each comprising a folding mirror and magnifying optics. The magnifying optics comprise a lens element. An additional lens, one surface of which is provided with a diffractive structure, is arranged between the image display panel and the hollow mirror.

8 Claims, 3 Drawing Sheets

HEAD-MOUNTED DISPLAY

BACKGROUND OF THE INVENTION

The invention relates to a head-mounted display comprising an image display system which is common for two separate light channels, and an optical system for projecting an image formed in the image display system in a right and a left exit pupil of the head-mounted display, the optical system comprising a hollow mirror, a beam splitter arranged between the hollow mirror and the image display system, and a first and a second light channel each comprising a folding mirror and an eyepiece having at least one lens element.

A head-mounted display of the type described in the opening paragraph is known from international patent application WO 96/05532. In the head-mounted display described in this application, a liquid crystalline image display panel is imaged on a left and a right exit pupil of the head-mounted display by means of a field lens, a hollow mirror and two crossed reflecting surfaces via two light channels. Each light channel comprises a folding mirror and an eyepiece consisting of three lenses. The exit pupils of the head-mounted display are assumed to coincide with the user's pupils. The image is imaged on the retina of both eyes of the user.

A drawback of the head-mounted display described in this application is that the large number of lenses and mirrors render the design relatively expensive and heavy. Instead of glass, inexpensive materials such as, for example synthetic resin material may be used. However, this has the drawback that the image realized thereby has a considerably poorer quality.

It is known per se to reduce the number of optical components by replacing the three-lens eyepieces by single-lens eyepieces, with one of its surfaces having a diffractive structure. This has the drawback that its picture quality is decreased because the eyepiece comprises one lens only. Moreover, two diffractive structures are to be provided on a curved surface.

SUMMARY OF THE INVENTION

It is an object of the present invention to provide a head-mounted display having a relatively simple design, a relatively satisfactory image quality and a relatively inexpensive and light-weight structure.

To this end, the head-mounted display according to the invention is characterized in that an additional optical element with one of its surfaces having a diffractive structure is arranged between the image display system and the beam splitter.

Since the additional element is common for the two light channels, it is sufficient to use a single diffractive structure, which simplifies the manufacture.

The eyepiece may comprise, for example two or three lenses. A preferred embodiment of the head-mounted display according to the invention is characterized in that the eyepiece is a single-lens eyepiece.

The number of optical components is limited thereby, so that the head mounted display will be lighter, while the optical quality of the image is maintained due to the presence of the additional optical element having the diffractive structure.

The additional optical element may be implemented in various ways. A preferred embodiment of the head-mounted display according to the invention is characterized in that the additional optical element has at least one flat side, with the diffractive structure being present on said flat side.

This combination can be realized most easily. A curvature of the surface on which the structure is provided does not have to be taken into account, as would indeed be the case if the diffractive structure were provided on the eyepieces.

A further embodiment of the head-mounted display according to the invention is characterized in that the diffractive structure is a circularly symmetrical blazed grating.

A circularly symmetrical blazed grating is understood to mean a circularly symmetrical grating which concentrates the intensity of the diffracted light in one higher order, for example, the first order.

Such a grating may be realized in various ways.

A first embodiment of the head-mounted display according to the invention is characterized in that the diffractive structure is a surface relief structure.

A second embodiment of the head-mounted display according to the invention is characterized in that the diffractive structure is a volume hologram.

A further embodiment of the head-mounted display according to the invention is characterized in that optical components of the head-mounted display with a curved surface have an aspherical surface.

Imaging errors such as coma, astigmatism and curvature of the image field are considerably reduced thereby.

A further embodiment of the head-mounted display according to the invention is characterized in that the image display panel is a reflective image display panel, in that the hollow mirror is at least semitransparent, with an illumination system being present on the side of the hollow mirror remote from the image display panel, in that the illumination system comprises a polarizer, and in that each light channel comprises a polarizer, the polarizer of the illumination system being crossed with respect to the polarizers in the light channels.

These and other aspects of the invention are apparent from and will be elucidated with reference to the embodiments described hereinafter.

DESCRIPTION OF THE PREFERRED EMBODIMENT

Figure 1A:
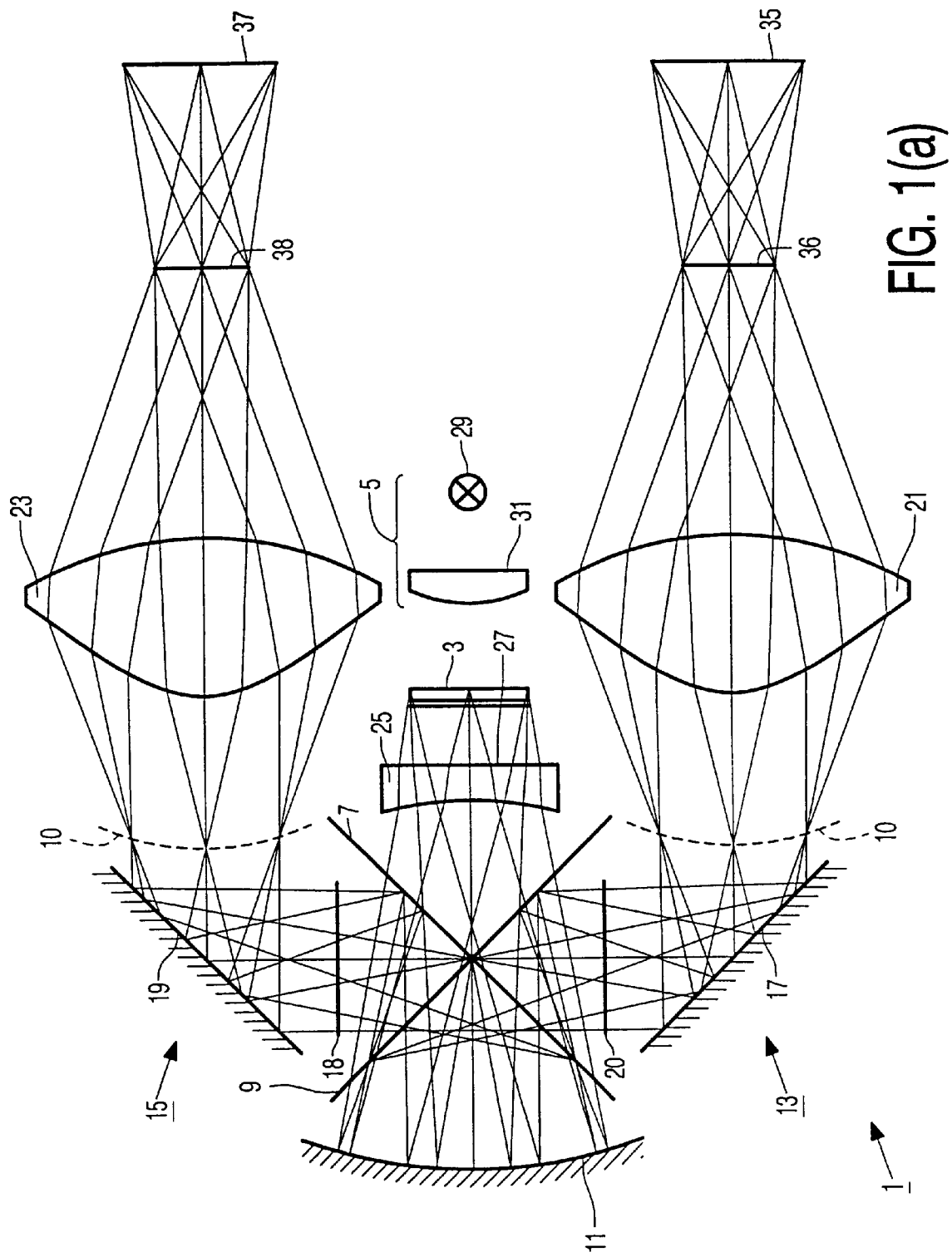
FIG. 1(a) shows diagrammatically a first embodiment of a head-mounted display according to the invention, with a transmissive image display panel.

The head-mounted display 1 shown diagrammatically in FIG. 1(a) comprises an image display system 3 which is represented for the sake of simplicity by a single image display panel. The image display panel may be, for example, a TN (twisted-nematic) liquid crystalline image display panel of the reflective or the transmissive type. The illumination may be realized by means of ambient light, but an illumination system 5 is preferably used because it has a much higher light output and, consequently, a brighter image can be obtained. The position of the illumination system is determined by the type of image display panel and will be elucidated hereinafter.

Figure 1B:
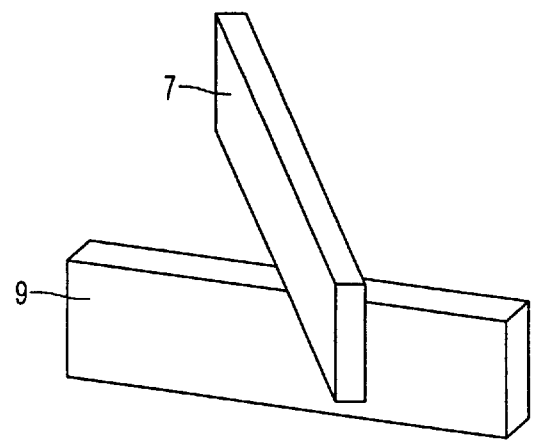
FIG. 1(b) shows, in detail, an embodiment of the mirror combination.

The head-mounted display 1 also comprises two splitting mirrors 7, 9 which enclose an angle with each other. An example of a possible combination of splitting mirrors is shown in FIG. 1(b). The image which is incident on this combination of mirrors is passed towards a hollow mirror 11 and is reflected on the hollow mirror as far as the mirrors 7, 9. As from these mirrors, the image is split across two light channels 13, 15. An intermediate image of the image display panel, magnified or not magnified is formed in each light channel 13, 15, which intermediate image is denoted by the reference numeral 10 at the area of the broken lines. The magnification of the intermediate image is determined by the hollow mirror 11 which functions as an imaging element. The intermediate image is subsequently imaged on the retina 35, 37 of both eyes of the user. The light channels 13, 15 terminate at the exit pupils 36, 38 which are assumed to coincide approximately with the user's pupils. Each light channel 13, 15 comprises a folding mirror 17, 19 and an eyepiece 21, 23, respectively, with the intermediate images being situated in their focal plane.

A part of the light coming from the image display panel and incident on the mirror combinations 7, 9 is passed by the mirror 9 towards the hollow mirror 11 and another part is sent towards the light channel 15. The part which is sent towards the light channel 15 is blocked by means of a blocking element 18 which is arranged between the mirror combination 7, 9 and the folding mirror 19. In fact, this light does not contribute to the formation of the image which is formed on the hollow mirror 11, but will lead to disturbing light. The splitting mirror 7 also passes a part of the incident beam towards the hollow mirror 11 but will also reflect a part towards the light channel 13. A blocking element 20 for suppressing the disturbing light in the light channel 13 is arranged between the mirror combination 7, 9 and the folding mirror 17. The light coming from the image display panel and reaching the hollow mirror 11 is reflected on this mirror. Approximately half of the image is sent from the mirror combination 7, 9 to the light channel 13 and the other half is sent to the light channel 15. The blocking elements 18, 20 have such a shape that this reflected light is not blocked. In practice, this means that the blocking element 18 in the vertical plane is complementary to the splitting mirror 7, and the blocking element 20 in the vertical plane is complementary to the splitting mirror 9. The light sent by the splitting mirror 7 into the light channel 13 is blocked by the element 20, while the light sent by the splitting mirror 9 into the light channel 13 and thus converted to an image via the hollow mirror 11 does not see the element 20. The light which is sent by the splitting mirror 9 into the light channel 15 is blocked by the element 18, while the light sent by the splitting mirror 7 into the light channel 15 and thus converted to an image via the hollow mirror 11 does not see the element 18.

The present invention proposes to arrange an additional optical element 25 having a diffractive structure 27 between the image display panel 3 and the mirror combination 7, 9. In this way, only one diffractive structure is required, which simplifies the manufacture of the display. In fact, it is known per se to provide a diffractive structure on each eyepiece in both light channels. This does not only require an extra diffractive structure, but the curvature of the lens surfaces of the eyepieces should also be taken into account. The diffractive structure 27 mainly compensates for the dispersion but generally does not have the function of optical correction element. The result thus is dispersion correction and a better image quality. The combination of the extra optical element and the diffractive structure allows an implementation of the eyepiece as a single-lens structure without having to sacrifice optical image quality. In this way, the number of optical components is reduced so that the head-mounted display will be considerably lighter.

The additional optical element 25 is preferably an element having at least one flat side, with the diffractive structure being present on this flat side. The element may be, for example, a plano-concave lens, a plano-convex lens or a plane-parallel plate. Since the structure is provided on the flat side, it can be maintained relatively simple so that the curvature of the surface does not have to be taken into account.

The diffractive structure is implemented as a circularly symmetrical blazed grating. A blazed grating is a grating whose intensity of the diffracted radiation is concentrated in one higher order, for example, the first order.

Figure 3:
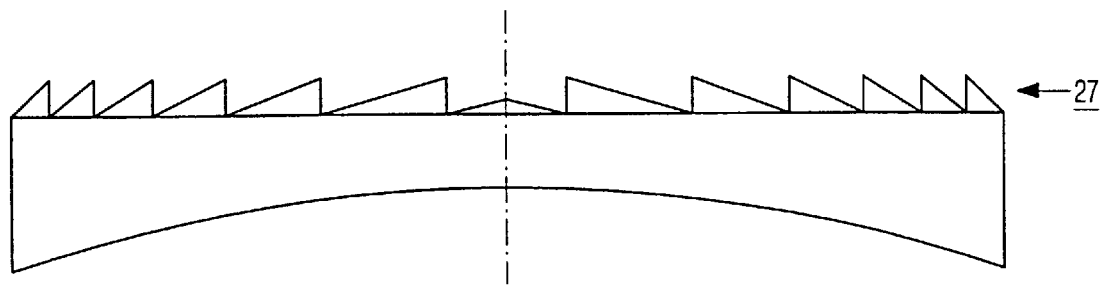
FIG. 3 is a cross-section of an embodiment of a circularly symmetrical blazed grating in the form of a surface relief structure.

Such a grating may be realized in various ways. A first possibility is shown in FIG. 3, in which the grating is constituted by a surface relief structure provided on the flat side of a plano-concave lens. The period of the structure is largest in the center of the grating and decreases towards the outer side of the structure.

Figure 4:
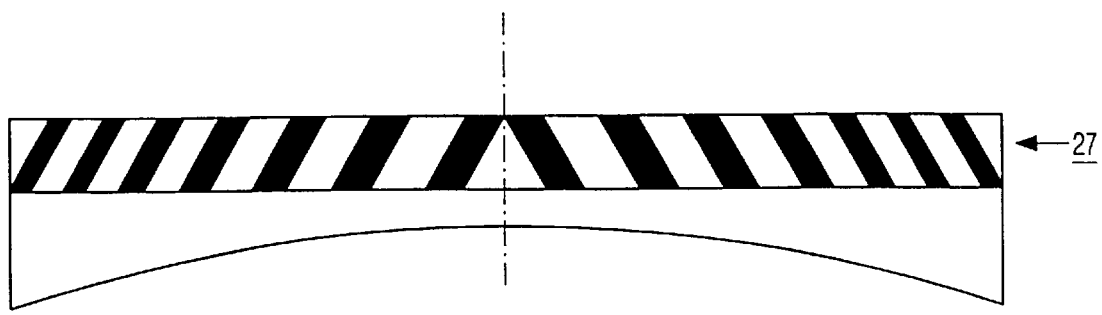
FIG. 4 is a cross-section of an embodiment of a circularly symmetrical blazed grating in the form of a volume hologram.

Another possibility is shown in FIG. 4, in which the blazed grating is arranged on a plano-concave lens as a volume hologram. In this example, the photosensitive layer is constituted by two types of layers having different refractive indices which alternate with each other. The layers extend transverse to the plane of the photosensitive layer. The width of the layers and the period of the structure decrease towards the outer side of the structure.

As already stated hereinbefore, the position of the illumination system is determined by the type of image display panel. The illumination system may also have a different composition for both types.

If a transmissive image display panel is used, the illumination system 5 is present on the side of the image display panel remote from the additional optical element 25, as is shown in FIG. 1(a). The illumination system 5 comprises, for example, a light source 29 and a condenser lens 31. The light from the light source 29 is collimated by the condenser lens 31 and is subsequently incident on the image display panel. The light source may be, for example, a LED or an array of LEDs or a gas discharge backlight unit. For a color image, it is important that the light source supplies "white" light.

Figure 2:
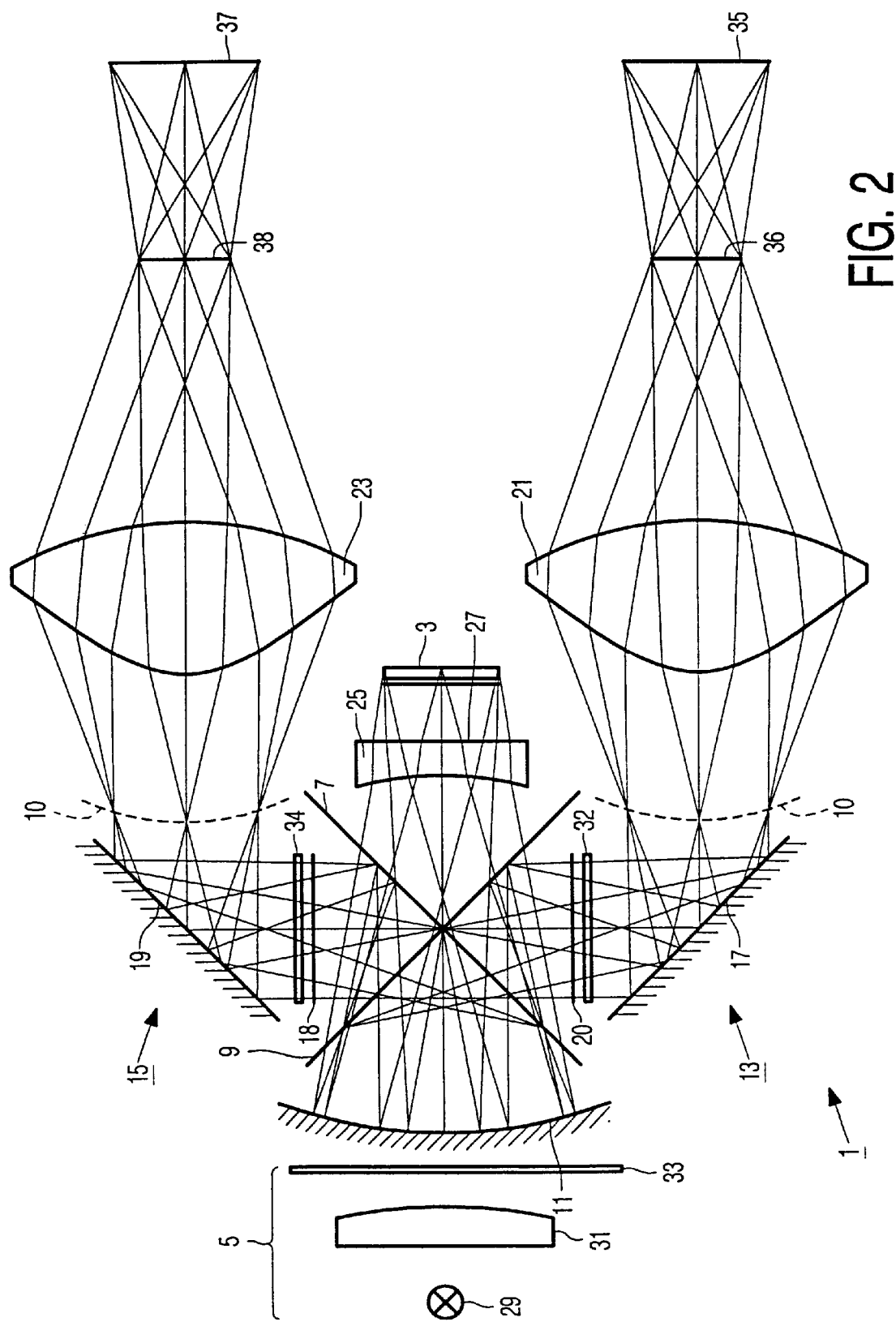
FIG. 2 shows diagrammatically a second embodiment of a head-mounted display according to the invention, with a reflective image display panel.

If a reflective image display panel is used, the hollow mirror 11 is implemented, for example, as a semitransparent mirror and the illumination system is arranged on the side of the hollow mirror 11 remote from the additional optical element 25. FIG. 2 shows an embodiment. In addition to a light source 29 and a condenser lens 31, the illumination system 5 now comprises a polarizer 33. The light beam from the light source 29 is collimated by the condenser lens 31 and is incident on the polarizer 33. The light is linearly polarized thereby, subsequently passes through the hollow mirror and partly through the mirror combination 7, 9 to the image display panel 3. After modulation and reflection by the image display panel, approximately half of the beam is sent into the light channel 13 and the other half of the beam is sent into the light channel 15. A polarizer 34 is arranged between the splitting mirror 7 and the folding mirror 19 of the light channel 15. A polarizer 32 is arranged between the splitting mirror 9 and the folding mirror 17 of the light channel 13. The directors of the two polarizers 32 and 34 have the same orientation, whereas the director of the polarizer 33 and the directors of the polarizers 32 and 34 are crossed. As a result, light which must give rise to dark pixels in the image will be blocked by the polarizers 32 and 34. The direction of polarization will be rotated of the light from pixels in the image display panel which have been activated and must give rise to bright pixels in the image. Consequently, this light will be passed entirely or partly by the polarizers, dependent on the grey level.

In this embodiment, the blocking elements 18, 20 may in principle be dispensed with because the polarizers only pass light which contributes to the formation of the image. Since, in practice, the polarizers are not perfect, they may nevertheless be provided for the purpose of optimizing the image contrast.

The polarizer 33 may be alternatively implemented as a reflective polarizer. The part of the light having the direction of polarization which is unwanted for the image display panel is then reflected towards the light source 29 and may be recuperated by means of a $\lambda/4$ plate and a reflector (not shown). The $\lambda/4$ plate is arranged between the light source 29 and the polarizer 33 and a reflector is arranged behind the light source. The $\lambda/4$ plate converts the linearly polarized light reflected by the polarizer into circularly polarized light. This circularly polarized light is incident on the reflector which will invert the direction of rotation and reflect this beam. After reflection on this reflector, this light reaches the reflective polarizer again and will now be passed towards the image display panel.

In a reflective image display panel, the light source comprises, for example, a red-green-blue LED. The image display panel is sequentially illuminated with the different colors, while the red, green and blue image consecutively appear on the image display panel, simultaneously with this illumination.

In the embodiments shown, the image display panel is arranged between the two light channels and the hollow mirror is present on the opposite side of the beam splitter. It is to be noted that it is also possible to exchange the positions of the hollow mirror and the image display system. The hollow mirror is then present between the two light channels and the image display system is then present on the opposite side of the beam splitter.

I claim:

1. A head-mounted display comprising an image display system which is common for two separate light channels, and an optical system for projecting an image formed in the image display system in a right and a left exit pupil of the head-mounted display, the optical system comprising a hollow mirror, a beam splitter arranged between the hollow mirror and the image display system, and a first and a second light channel each comprising a folding mirror and an eyepiece having at least one lens element, characterized in that an additional optical element with one of its surfaces having a diffractive structure is arranged between the image display system and the beam splitter.

2. A head-mounted display as claimed in claim 1, wherein the eyepiece is a single-lens eyepiece.

3. A head-mounted display as claimed in claim 1, wherein the additional optical element has at least one flat side, with the diffractive structure being present on said flat side.

4. A head-mounted display as claimed in claim 1, wherein the diffractive structure is a circularly symmetrical blazed grating.

5. A head-mounted display as claimed in claim 4, wherein the diffractive structure is a surface relief structure.

6. A head-mounted display as claimed in claim 4, wherein the diffractive structure is a volume hologram.

7. A head-mounted display as claimed in claim 1, characterized in that optical components of the head-mounted display with a curved surface have an aspherical surface.

8. A head-mounted display as claimed in claim 1, characterized in that the image display panel is a reflective image display panel, in that the hollow mirror is at least semitransparent, with an illumination system being present on the side of the hollow mirror remote from the image display panel, in that the illumination system and each light channel comprise a polarizer, the polarizer of the illumination system being crossed with respect to the polarizers in the light channels.

* * * * *